United States Patent
Hashimoto

(10) Patent No.: US 7,652,784 B2
(45) Date of Patent: Jan. 26, 2010

(54) IMAGE FORMING APPARATUS, IMAGE FORMING METHOD AND IMAGE FORMING SYSTEM FOR RECEIVING AND EXECUTING PLURALITY OF PRINT JOBS

(75) Inventor: Yasuhiro Hashimoto, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 801 days.

(21) Appl. No.: 10/805,229

(22) Filed: Mar. 22, 2004

(65) Prior Publication Data

US 2004/0239994 A1  Dec. 2, 2004

(30) Foreign Application Priority Data

May 30, 2003  (JP) .............................. 2003-154729

(51) Int. Cl.
- *G06F 15/00* (2006.01)
- *G06K 1/00* (2006.01)
- *G06K 15/00* (2006.01)
- *G06F 3/12* (2006.01)

(52) U.S. Cl. .................................... 358/1.18; 358/1.13
(58) Field of Classification Search ................ 358/1.18, 358/1.15, 540
See application file for complete search history.

(56) References Cited

U.S. PATENT DOCUMENTS

| | | | | |
|---|---|---|---|---|
| 5,212,786 A * | 5/1993 | Sathi | ........................... | 707/101 |
| 5,243,381 A * | 9/1993 | Hube | ........................... | 399/84 |
| 5,442,732 A * | 8/1995 | Matysek et al. | ............. | 358/1.17 |
| 5,600,762 A * | 2/1997 | Salgado et al. | .............. | 358/1.15 |
| 5,715,381 A * | 2/1998 | Hamilton | .................... | 358/1.15 |
| 5,861,958 A * | 1/1999 | Jamrog | ........................ | 358/403 |
| 5,878,196 A * | 3/1999 | Suzuki | ....................... | 358/1.15 |
| 5,961,958 A * | 10/1999 | Homola et al. | ................ | 424/49 |
| 6,498,657 B1 * | 12/2002 | Kuntz et al. | ................ | 358/1.15 |
| 6,512,899 B2 * | 1/2003 | Shimada et al. | .............. | 399/82 |
| 6,674,540 B1 * | 1/2004 | Wiechers et al. | ........... | 358/1.15 |
| 6,961,139 B1 | 11/2005 | Kita et al. | | |
| 6,965,445 B2 * | 11/2005 | Dimperio et al. | ........... | 358/1.15 |
| 2003/0007167 A1 * | 1/2003 | Catt et al. | .................. | 358/1.12 |

FOREIGN PATENT DOCUMENTS

| | | |
|---|---|---|
| JP | 11-129586 | 5/1999 |
| JP | 2000-301799 | 10/2000 |
| JP | 2000-307777 | 11/2000 |

OTHER PUBLICATIONS

Japanese Preliminary Notice of Rejection, mailed May 19, 2009, directed to counterpart Japanese Patent Application No. 2003-154729; 7 pages.

* cited by examiner

*Primary Examiner*—Douglas Q Tran
(74) *Attorney, Agent, or Firm*—Morrison & Foerster LLP

(57) ABSTRACT

In the image forming apparatus, upon reception of a job containing a file to be printed, it is determined whether or not the job contains a template indicating that a plurality of files are to be merged. If it is determined that the job contains the template, then the job is stored in a storage section. Based on the template, it is analyzed whether or not all jobs containing files to be merged have been stored in the storage section. If it is determined that all the jobs have been stored in the storage section, then control is exerted based on the template so as to merge and print the files contained in all the jobs. Thus, a plurality of files can be automatically merged and printed, and therefore the workload on the user can be reduced.

22 Claims, 3 Drawing Sheets

Fig.3

| JOB NAME | CONTENT OF TEMPLATE INSTRUCTION | OPERATION OF IMAGE FORMING APPARATUS |
|---|---|---|
| (1/3) FRONT PAGE. DOC | MERGE : 1ST FILE IN 3 FILES | STORING IN STORAGE SECTION |
| (2/3) TEXT. DOC | MERGE : 2ND FILE IN 3 FILES | STORING IN STORAGE SECTION |
| (3/3) ATTACHMENT. XLS | MERGE : 3RD FILE IN 3 FILES | MERGING AND PRINTING 3 FILES |
| (TMP) SCREEN A. JPG | STORE : NO PRINTING | TEMPORARILY STORING IN STORAGE SECTION |
| (PRT) SCREEN B. JPG | PRINT : PRINT ALL THE STORED FILES | MERGING AND PRINTING TEMPORARILY STORED FILES IN STORAGE SECTION |

IMAGE FORMING APPARATUS, IMAGE FORMING METHOD AND IMAGE FORMING SYSTEM FOR RECEIVING AND EXECUTING PLURALITY OF PRINT JOBS

This application is based on an application No. 2003-154729 filed in Japan, the contents of which are hereby incorporated by reference.

BACKGROUND OF THE INVENTION

The present invention relates to an image forming apparatus and an image forming method for receiving and executing a plurality of print jobs. The present invention also relates to an image forming system for performing such an image forming method on a network.

For printing of a plurality of files with a printing apparatus, in general, a user prints each file separately. Therefore, when double-sided printing or intensive printing is executed, a blank page or space may be generated at the end of each file depending on the print page number. Particularly, in the case where for creation of a report or the like, texts are prepared with a word processor software while experimental results are prepared with a spread sheet software, merging separately printed files would involve intervenient occurrence of blank pages, damaging the integrity of the report. It would also be a waste of paper.

In this connection, for example in JP2000-301799A, there has been proposed a technique of applying appropriate scaling to varied page sizes in one job so that these pages are laid out within output pages.

However, in the case where a plurality of files are different in file form from one another, users may find it difficult or, in some cases, impossible to merge those files together before printing.

SUMMARY OF THE INVENTION

Accordingly, an object of the present invention is to provide an image forming apparatus and an image forming method which allow a plurality of files to be automatically merged and printed and, as a result, which allow user's workload to be reduced. Another object of the present invention is to provide an image forming system for executing such an image forming method on a network.

In order to accomplish the above objects, an image forming apparatus of the present invention comprises:

a template determination section for, upon reception of a job including a file to be printed, determining whether or not the job contains a template which indicates that a plurality of files are to be merged;

a job holding section for making the job stored in a storage section when it is determined by the template determination section that the job contains the template;

a template analysis section for analyzing based on the template whether or not all jobs containing files to be merged are stored in the storage section; and a control section for exerting control based on the template so as to merge and print the files contained in all the jobs when it is determined by the template analysis section that all the jobs are stored in the storage section.

Herein, the "job" may contain, other than data and a print execution command of a file, specific print processing instructions such as double-sided printing, intensive printing, stapling and punching. "Double-sided printing" is to print images onto both side of a sheet. "Intensive printing" is to print images of two or more pages onto one sheet. "Stapling" is to staple sheets so as to bind them. "Punching" is to punch hole in a sheet or sheets.

The "template" refers to an instruction set for over a plurality of jobs according to specified rules to merge and print a plurality of files. The template may be, for example, serial numbers set for over a plurality of files. The template may be contained, for example, in job names.

In the image forming apparatus of the present invention, upon reception of a job containing a file to be printed, the template determination section determines whether or not the job contains a template indicating merging of a plurality of files. If it is determined by the template determination section that the job contains the template, then the job holding section makes the job stored in the storage section. The template analysis section analyzes whether or not all the jobs containing the files to be merged have been stored in the storage section based on the template. If it is determined by the template analysis section that all the jobs have been stored in the storage section, then the control section exerts control based on the template so as to merge and print the files contained in all the jobs.

Thus, in the image forming apparatus, a plurality of files are automatically merged and printed. Therefore, the user does not have to merge files in advance. As a result, the workload on the user is reduced and convenience is increased.

In one embodiment of the image forming apparatus, the template is contained in a job name.

In the image forming apparatus in this one embodiment, the template is contained in a job name, so that the template determination section can easily determine based on the job name whether or not the job contains the template.

In one embodiment of the image forming apparatus, the template is serial numbers set for over a plurality of the files.

In the image forming apparatus in this one embodiment, the serial number represents a sort order in which a plurality of the files are merged. This increases convenience for users.

In one embodiment of the image forming apparatus, the template is composed of a pair of a first symbol indicating that a file contained in one job is temporarily stored in the storage section and a second symbol indicating that files temporarily stored in the storage section are merged and printed.

In the image forming apparatus in this one embodiment, the template is composed of a pair of the first symbol and the second symbol, so that the template is simply represented. This increases convenience for users.

In one embodiment of the image forming apparatus, the job contains, other than data and a print execution command of the file, a specific print processing instruction indicating double-sided printing, intensive printing, stapling or punching.

In the image forming apparatus in this one embodiment, specific printing processes indicating double-sided printing, intensive printing, stapling or punching are enabled. This increases convenience for users.

In one embodiment of the image forming apparatus, printing of all the jobs is executed in compliance with a specific print processing instruction contained in a last received job among all the jobs.

In the image forming apparatus in this one embodiment, printing of all the jobs is executed in compliance with the specific print processing instruction contained in the last received job in all the jobs. Therefore, if the print processing instruction indicates execution of such processing as double-sided printing, intensive printing, stapling and punching, the same processing (e.g., double-sided printing, intensive printing, stapling and punching) is automatically performed on all the merged files. This increases convenience for users.

In one embodiment, the image forming apparatus further comprises a communication section for receiving jobs containing files to be printed via a network.

In the image forming apparatus in this one embodiment, the jobs containing files to be printed can be received by the communication section via a network. This increases convenience for users.

An image forming method of the present invention comprises the steps of:

determining, upon reception of a job containing a file to be printed, whether or not the job contains a template indicating that a plurality of files are to be merged;

making the job stored in a storage section when it is determined by the above step that the job contains the template;

analyzing based on the template whether or not all jobs containing files to be merged have been stored in the storage section; and exerting control based on the template so as to merge and print the files contained in all the jobs when it is determined by the above step that all the jobs have been stored in the storage section.

In one embodiment of the image forming method, the template is contained in a job name.

In one embodiment of the image forming method, the template is serial numbers set for over a plurality of the files.

In one embodiment of the image forming method, the template is composed of a pair of a first symbol indicating that a file contained in one job is temporarily stored in the storage section and a second symbol indicating that files temporarily stored in the storage section are merged and printed.

In one embodiment of the image forming method, the job contains, other than data and a print execution command of the file, specific print processing instructions indicating double-sided printing, intensive printing, stapling and punching.

In one embodiment of the image forming method, printing of all the jobs is executed in compliance with a specific print processing instruction contained in a last received job among all the jobs.

In one embodiment of the image forming method, jobs containing files to be printed are received by a communication section via a network.

An image forming system of the present invention comprises:

a terminal connected to a network and serving for instructing a job containing a file to be printed;

a printing section connected to the network and serving for executing printing in response to an instruction or control;

a template determination section for determining whether or not the job instructed by the terminal via the network contains a template which indicates that a plurality of files are to be merged;

a job holding section for making the job stored in a storage section when it is determined by the template determination section that the job contains the template;

a template analysis section for analyzing based on the template whether or not all jobs containing files to be merged have been stored in the storage section; and a control section for exerting control based on the template so as to merge the files contained in all the jobs and make the printing section print the files when it is determined by the template analysis section that all the jobs have been stored in the storage section.

In the image forming system of the present invention, a user instructs a job containing a file to be printed by the printing section by using a terminal connected to the network. Then, the template determination section determines whether or not the job instructed by the terminal via the network contains a template indicating that a plurality of files are merged. If it is determined by the template determination section that the job contains the template, then the job holding section makes the job stored in the storage section. The template analysis section analyzes based on the template whether or not all the jobs containing the files to be merged have been stored in the storage section. If it is determined by the template analysis section that all the jobs have been stored in the storage section, then the control section exerts control based on the template so as to merge the files contained in all the jobs and make the printing section print the files. Then, the printing section executes printing in response to the control by the control section.

Thus, in the image forming system, a plurality of files are automatically merged and printed. Therefore, the user does not have to merge files in advance. As a result, the workload on the user is reduced and convenience is increased.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing examples of content of template for use in the image forming apparatus.

DETAILED DESCRIPTION OF THE PREFERRED EMBODIMENTS

The present invention will be described hereinbelow in detail in conjunction with embodiments thereof with reference to the accompanying drawings.

Figure 1:
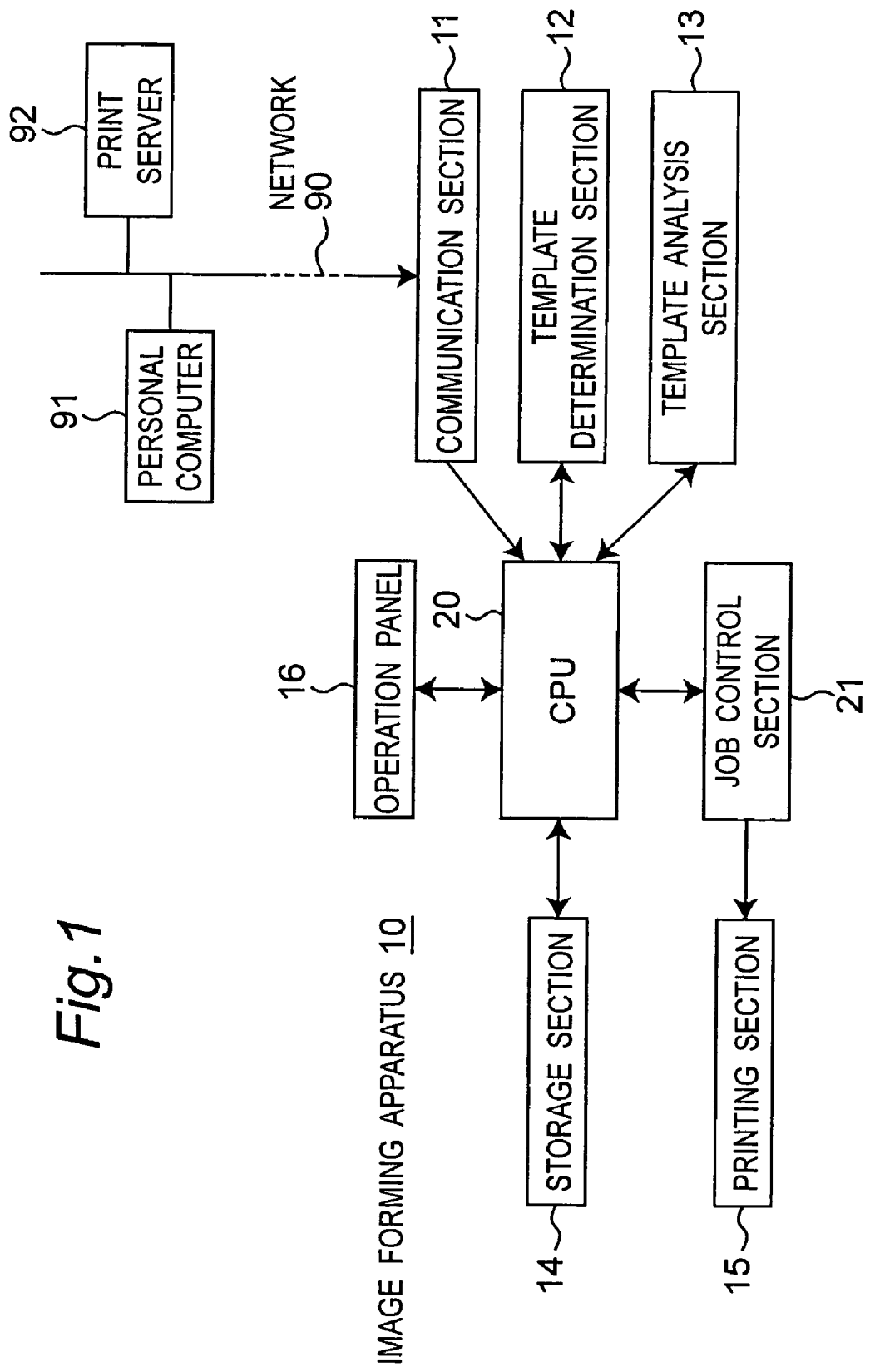
FIG. 1 is a block diagram showing an image forming system including an image forming apparatus in one embodiment of the present invention.

FIG. 1 is a block diagram showing an image forming system including an image forming apparatus (shown by reference numeral 10) in one embodiment of the present invention. The image forming apparatus 10 is composed of an operation panel 16 for a user to perform various inputs, a communication section 11 for receiving print jobs via a network 90, a template determination section 12 for determining whether or not a received job contains a template indicating that a plurality of files are to be merged, a template analysis section 13 for analyzing contents of the template, a storage section 14 for holding data of the jobs therein, a job control section 21 for exerting control as a control section so as to merge and print the files of the jobs, a printing section 15 for executing printing, and a CPU (Central Processing Unit) 20 for controlling all the above-mentioned components. The network 90 is further connected to a personal computer 91 as a terminal for users to instruct jobs containing files to be printed and to a print server 92.

Herein, the "job" may contain, other than data and a print execution command of a file, specific print processing instructions such as double-sided printing, intensive printing, stapling and punching.

The "template" refers to an instruction set for over a plurality of jobs according to specified rules to merge and print a plurality of files.

In a first example, as shown in the upper half portion of a left column in FIG. 3, the template is serial numbers of (1/3) (2/3) (3/3) set for over three files, (front page.doc), (text.doc) and (attachment.xls). The template (1/3) indicates that the file is the first file among three files to be merged, and the template (2/3) indicates that the file is the second file among three files to be merged. Further, the template (3/3) indicates that the file is the third file among three files to be merged, and instructs that the files to be merged are merged and printed. Thus, these templates indicate that three files are sorted in the order of (front page.doc), (text.doc) and (attachment.xls), and merged and printed. It is to be noted that in this example, the job name is composed of a template and a file name.

Figure 2:
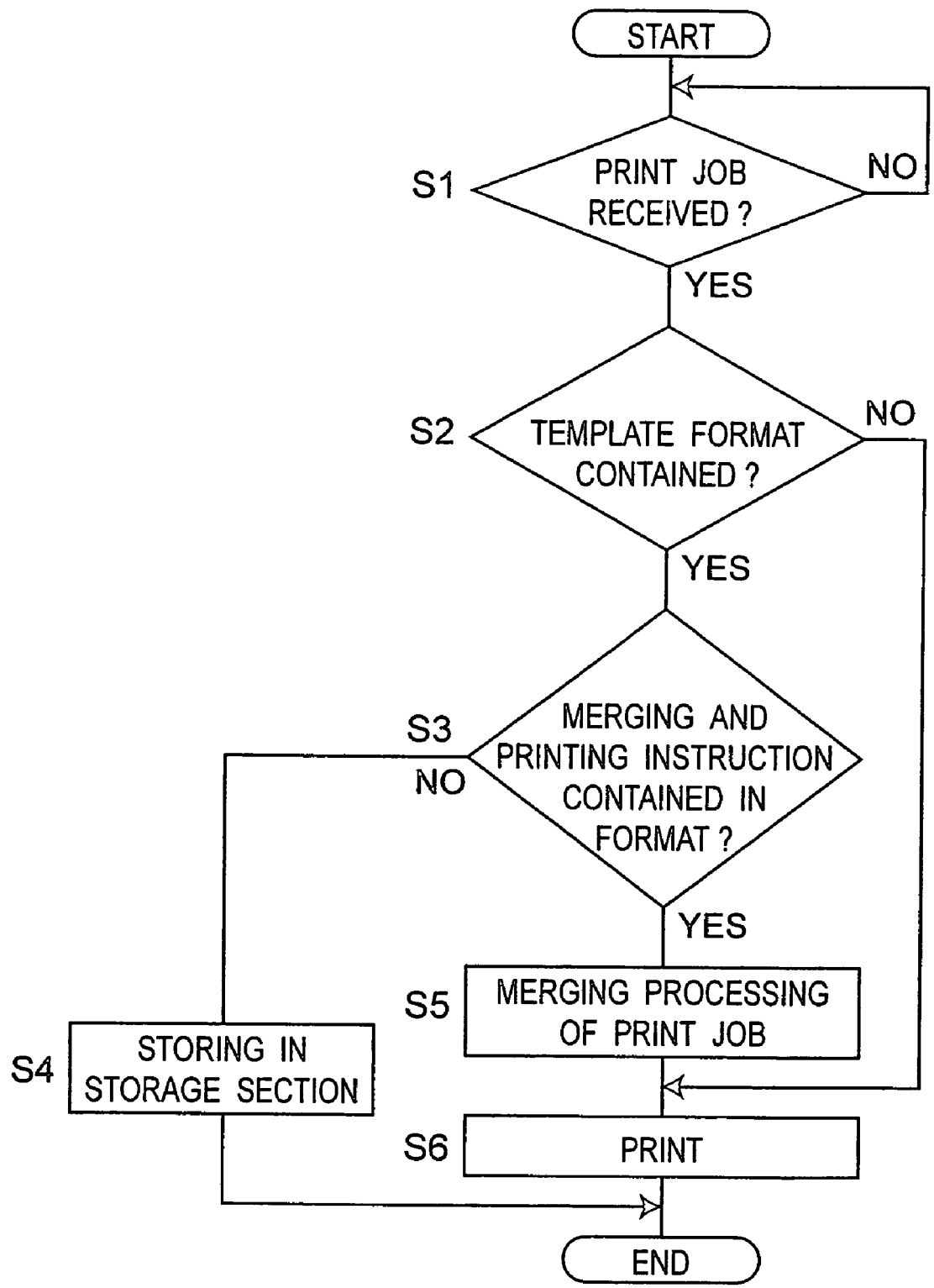
FIG. 2 is a control flow chart of the image forming apparatus included in the image forming system.

As shown in FIG. 2, the image forming apparatus 10 is in the state that the communication section 11 is normally enabled to receive print jobs via the network 90 (S1). It is assumed here that a user instructs a print job containing files to be printed by the image forming apparatus 10 with use of the personal computer 91 connected to the network 90.

When the communication section 11 receives one print job (YES in S1), the template determination section 12 determines whether or not the job contains a template indicating that a plurality of files are to be merged (S2). In this example, the template is contained in the job name, so that the template determination section 12 can easily determine based on the job name whether or not the job contains the template.

If the template determination section 12 determines that the job does not contain the template (NO in S2), then the job is sent to the job control section 21 intact. Then under control by the job control section 21, the file of the job is printed by the printing section 15 (S6).

On the other hand, if the template determination section 12 determines that the job contains the template (YES in S2), then it is determined based on the template whether or not the job is the last job containing a file to be merged (S3). If the job is not the last job containing a file to be merged (NO in S3), then the CPU 20 functions as a job holding section to suspend printing of the job and to store the job in the storage section 14 (S4).

When the communication section 11 receives jobs other than the aforementioned job, the same processing is applied thereto (S1-S4, S6).

Meanwhile, if the job is the last job containing a file to be merged (equivalent to the third job (3/3), attachment.xls in the aforementioned template example) (YES in S3), the template analysis section 13 analyzes, based on the template of the job stored in the storage section 14, whether or not all the jobs containing the files to be merged have been stored in the storage section 14. If it is determined by the template analysis section 13 that all the jobs have been stored in the storage section 14, then the job control section 21 exerts control based on the template to merge the files contained in all the jobs (S5). Then under control by the job control section 21, the printing section 15 prints the merged files (S6).

In the case of the example of the aforementioned template, when all the jobs of (1/3) front page.doc, (2/3) text.doc and (3/3) attachment.xls are stored in the storage section 14, these three files "front page.doc", "text.doc" and "attachment.xls" are automatically merged and printed. Therefore, the user does not have to merge files in advance. As a result, the workload on the user is reduced and convenience is increased.

In another example, as shown in the lower half portion in the left column in FIG. 3, the template is a pair of a template (TMP) as a first symbol and a template (PRT) as a second symbol set for over two files (screen A.jpg) and (screen B.jpg). The template (TMP) indicates that the file is not printed but temporarily stored in the storage section 14 (temporary storage), while the template (PRT) indicates that the temporary storage files in the storage section 14 are to be all merged and printed. Since the template is composed of a pair of (TMP) and (PRT), the template is simply represented.

In the case where such a template is used, if all the jobs of (TMP) screen A.jpg and (PRT) screen B.jpg are stored in the storage section 14, these two files "screen A.jpg" and "screen B.jpg" are automatically merged and printed. Therefore, the user does not have to merge files in advance. As a result, the workload on the user is reduced and convenience is increased.

It is to be noted that printing of all the jobs may be executed in compliance with a specific print processing instruction contained in the last received job among all the jobs to be printed. In the case of the example of the template shown in FIG. 3, when the last job (3/3) attachment.xls and the (PRT) screen B.jpg contain instructions such as double-sided printing, intensive printing, stapling and punching, the same processing (such as double-sided printing, intensive printing, stapling and punching) is automatically applied to all the merged files. In this case, the user no longer has to make the aforementioned print processing instructions for every job. This increases convenience for users.

It is to be noted that the template is contained in the job name in this embodiment, but the present invention is not limited thereto. It is also applicable to put the template within a character string of a watermark print instruction.

Further, it is also possible to perform the control shown in FIG. 2 not in the image forming apparatus 10 but in the print server 92 shown in FIG. 1. In that case, the image forming apparatus 10 performs the printing (S6) by the printing section 15 in compliance with the control by the print server 92 via the network 90.

Thus, according to this invention, it becomes possible to automatically merge and print a plurality of files, and so the workload on the user may be reduced.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. An image forming apparatus, comprising:

a template determination section configured to determine, upon reception of a first job including a first file to be printed, whether or not the first job is associated with a first template which is provided to the first job and indicates that the first file is to be merged, and upon reception of a second job including a second file to be printed, whether or not the second job is associated with a second template which is provided to the second job and indicates that the second file is to be merged;

a job holding section configured to store the first job in a storage section when it is determined by the template determination section that the first job is associated with the first template;

a template analysis section configured to determine, based on the first template and the second template, whether or not the first job to be merged with the second job is stored in the storage section; and a control section configured to exert control so as to merge and print the first file and the second file when it is determined by the template analysis section that the first job to be merged with the second job is stored in the storage section.

2. The image forming apparatus as defined in claim 1, wherein
the first template is included in a job name.

3. The image forming apparatus as defined in claim 1, wherein the first template comprises serial numbers set for the first file.

4. The image forming apparatus as defined in claim 1, wherein
the template determination section is further configured to determine whether the first file associated with a third template comprising at least one of a first symbol indicating that the first file is to be temporarily stored in the storage section or a second symbol indicating that files temporarily stored in the storage section are to be merged and printed.

5. The image forming apparatus as defined in claim 1, wherein
the first job comprises, other than data and a print execution command of the file, a specific print processing instruction indicating at least one of double-sided printing, intensive printing, stapling or punching.

6. The image forming apparatus as defined in claim 1, wherein
printing of the first and second jobs is executed in compliance with a specific print processing instruction contained in the second job.

7. The image forming apparatus as defined in claim 1, further comprising a communication section configured to receive jobs containing files to be printed via a network.

8. An image forming method, comprising:
determining, upon reception of a first job including a file to be printed, whether or not the first job is associated with a first template provided to the first job and indicating that the first file to be merged, and upon reception of a second job including a second file to be printed, whether or not the second job is associated with a second template which is provided to the second job and indicates that the second file is to be merged;
storing the first job in a storage section when it is determined that the first job is associated with the first template;
analyzing based on the first template and the second template whether or not the first job to be merged with the second job has been stored in the storage section; and
exerting control so as to merge and print the first file and the second file when it is determined that the first job to be merged with the second job has been stored in the storage section.

9. The image forming method as defined in claim 8, wherein
the first template is included in a job name.

10. The image forming method as defined in claim 8, wherein the first template comprises serial numbers set for the first file.

11. The image forming method as defined in claim 8, further comprising:
determining whether the first file is associated with a third template comprising at least one of a first symbol indicating that the first file is to be temporarily stored in the storage section or a second symbol indicating that files temporarily stored in the storage section are to be merged and printed.

12. The image forming method as defined in claim 8, wherein
the first job includes, other than data and a print execution command of the file, specific print processing instructions indicating double-sided printing, intensive printing, stapling and punching.

13. The image forming method as defined in claim 8, wherein
printing of the first and second jobs is executed in compliance with a specific print processing instruction contained in the second job.

14. The image forming method as defined in claim 8, wherein
jobs containing files to be printed are received by a communication section via a network.

15. An image forming system, comprising:
a terminal connected to a network, the terminal configured to instruct a first job including a first file and a second job including a second file to be printed;
a printing section connected to the network, the printing section configured to execute printing in response to an instruction or control;
a template determination section configured to determine whether or not the first job instructed by the terminal via the network is associated with a first template which is provided to the first job and indicates that the first file is to be merged whether or not the second job instructed by the terminal via the network is associated with a second template which is provided to the second job and indicates that the second file is to be merged;
a job holding section configured to store the first job in a storage section when it is determined by the template determination section that the first job is associated with the first template;
a template analysis section configured to determine, based on the first template and the second template, whether or not the first job to be merged with the second job is stored in the storage section; and
a control section configured to exert control so as to merge the first file and the second file and make the printing section print the plurality of files when it is determined by the template analysis section that the first job to be merged with the second job has been stored in the storage section.

16. An image forming apparatus, comprising:
a template determination section configured to determine, upon reception of a job including a file to be printed, whether or not the job is associated with a template which is provided to each of a plurality of jobs and indicates that the file is to be merged with another file included in another job;
a template analysis section configured to determine, based on the template, whether or not the template is a predetermined template indicating that the job is to be merged with the other job and to be printed;
a job holding section configured to store the job in a storage section when it is determined by the template analysis section that the template is not the predetermined template;
a control section configured to exert control based on the template so as to merge the file with the other file stored in the storage section and print when it is determined by the template analysis section that the template is the predetermined template.

17. The image forming apparatus as defined in claim 16, wherein the template is included in a job name.

18. The image forming apparatus as defined in claim 16, wherein the template comprises serial numbers set for the file.

19. The image forming apparatus as defined in claim 16, wherein the template determination section is further configured to determine whether a second file is associated with a second template comprising at least one of a first symbol indicating that the first file is to be temporarily stored in the storage section or a second symbol indicating that files temporarily stored in the storage section are to be merged and printed.

20. The image forming apparatus as defined in claim 16, wherein the first job comprises, other than data and a print execution command of the file, a specific print processing instruction indicating at least one of double-sided printing, intensive printing, stapling or punching.

21. The image forming apparatus as defined in claim 16, wherein printing of all the jobs is executed in compliance with a specific print processing instruction contained in a last received job among all the jobs.

22. The image forming apparatus as defined in claim 16, further comprising a communication section configured to receive jobs containing files to be printed via a network.

* * * * *

UNITED STATES PATENT AND TRADEMARK OFFICE
CERTIFICATE OF CORRECTION

PATENT NO.       : 7,652,784 B2                                       Page 1 of 1
APPLICATION NO. : 10/805229
DATED            : January 26, 2010
INVENTOR(S)      : Yasuhiro Hashimoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,652,784 B2 |
| APPLICATION NO. | : 10/805229 |
| DATED | : January 26, 2010 |
| INVENTOR(S) | : Yasuhiro Hashimoto |

It is certified that error appears in the above-identified patent and that said Letters Patent is hereby corrected as shown below:

On the Title page:

Under Item 56, Foreign Patent Documents please add:

--JP-2001-339542      12/2001

JP-2001-209506-A     8/2001--

Signed and Sealed this
Fourth Day of September, 2012

David J. Kappos
*Director of the United States Patent and Trademark Office*